(No Model.)
P. W. POWER.
JOURNAL BEARING AND PILLOW BLOCK.
No. 567,165. Patented Sept. 8, 1896.
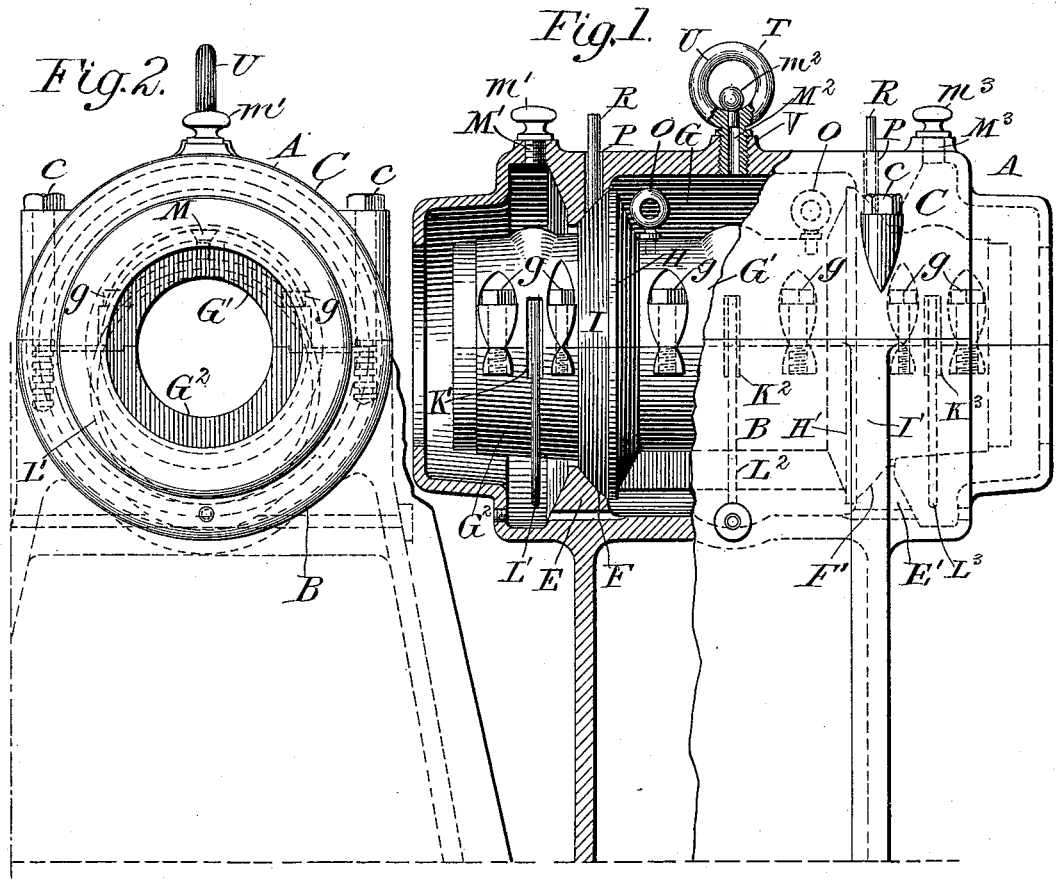
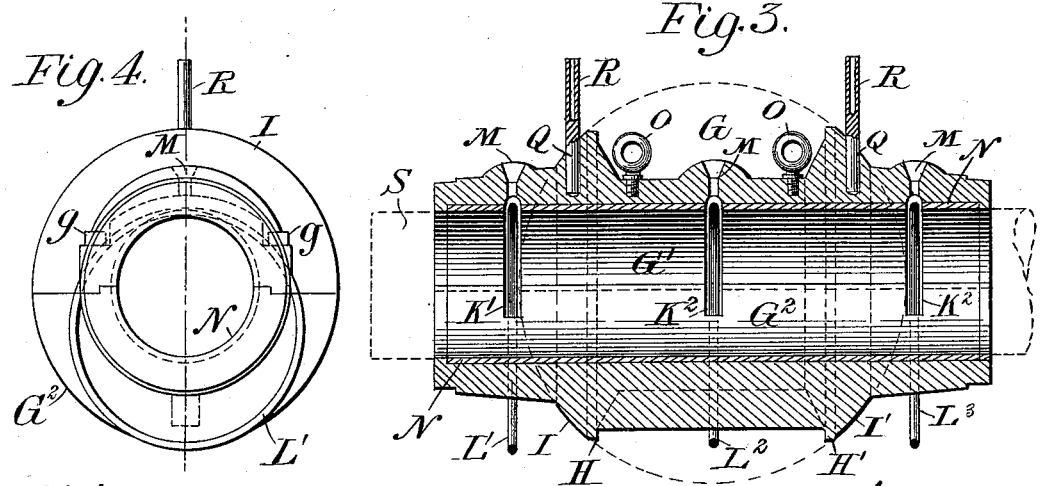
Witnesses:
J. L. Oswald.
H. M. Skinner.
Inventor:
Pomeroy W. Power
by H. B. Brownell
his Attorney
THE NORRIS PETERS CO., PHOTO-LITHO., WASHINGTON, D. C.

UNITED STATES PATENT OFFICE.

POMEROY W. POWER, OF PITTSFIELD, MASSACHUSETTS, ASSIGNOR TO THE STANLEY ELECTRIC MANUFACTURING COMPANY, OF SAME PLACE.

JOURNAL-BEARING AND PILLOW-BLOCK.

SPECIFICATION forming part of Letters Patent No. 567,165, dated September 8, 1896.

Application filed February 20, 1896. Serial No. 580,123. (No model.)

*To all whom it may concern:*

Be it known that I, POMEROY W. POWER, a citizen of the United States, residing at Pittsfield, county of Berkshire, and State of Massachusetts, have invented certain new and useful Improvements in Journal-Bearings and Pillow-Blocks, of which the following is a specification.

My improvement relates to that class of bearings known as "self-alining" bearings, and pillow-blocks for supporting the same, and has for its object to provide a bearing and block which shall support the shaft in a better manner; also, a self-alining bearing which shall be better lubricated, which can be made of greater length, which is more easily removable than other self-alining bearings, and the condition of which can be easily determined so far as heating is concerned while the shaft which it supports is in motion.

One feature of my invention also has for its object to provide a ring-bolt for any point in the cap of the pillow-block which shall not interfere with the lubrication of the journal at that point.

The following is a description of my invention, reference being had to the accompanying drawings, in which—

Figure 1 is a side elevation of the bearing and pillow-block, certain portions of the pillow-block having been broken away. Fig. 2 is an end view of the same. Fig. 3 is a vertical section of the bearing removed from the pillow-block. Fig. 4 is an end elevation of the same.

A is the pillow-block, formed of a base B, and bolted thereto at $c$ a cap C, having between them a concavity large enough to accommodate the bearing. Within this concavity there are two encircling ridges E E', separated for a distance greater than the spherical radius and having surfaces F F', which are two parallel zones on the same spherical surface and preferably at equal distances from the center. Supported by these two zones is the bearing G for the shaft S, which bearing preferably consists of two parts $G'$ $G^2$, fastened together by bolts $g$ $g$. This bearing G has two encircling projections H H', whose surfaces I I' are two parallel zones on the surface of a sphere of the same diameter as that of the surfaces F F' and corresponding in distances from the center to the surfaces F F'. The bearing G has grooves $K'$ $K^2$ $K^3$ for the oil-rings $L'$ $L^2$ $L^3$. The grooves have the vents or oil-holes M M M and lie directly beneath the oil-holes $M'$ $M^2$ $M^3$, with their plugs $m'$ $m^2$ $m^3$ in the cap of the pillow-block. The bearing has the ordinary lining N and has ring-bolts O O for lifting off the upper portion.

In the cap C of the pillow-block are two holes P P, and securely inserted in holes Q Q in the bearing G are pins R R, which are somewhat smaller than the holes P P, so as to have some play. These pins I prefer to make of some good heat-conducting metal, such as copper, and with their upper portions tubular, as shown, so that a thermometer may be inserted for the purpose of determining whether the bearing is heating at all.

The normal function of the pin is to resist any tendency of the bearing to rotate within the pillow-block, and when constructed as just described it has the added function of furnishing a means of determining the condition of the bearing. The location of the pins on the upper part of the bearing has another important advantage, since it permits the removal of the bearing without raising the shaft S, as after the cap C and the upper part $G'$ of the bearing G have been removed the lower part $G^2$ can be slipped around the shaft and taken out. The shaft S of course would have to be supported, but need not be raised more than to remove its weight and friction from the part $G^2$.

The cap C is removed by the ring-bolt T, consisting of the ring U and the screw-threaded shank V. This ring-bolt is located at a point in the center and comes over the central oil-ring $L^2$. In order that it may not interfere with the application of fresh oil directly at that point, I make a hole $M^2$ directly through the center of the shank V, in which I insert a plug $m^2$.

The bearing and pillow-block as thus constructed is self-alining, the zones permitting movement of the shaft in any direction and the pins R R having sufficient play for any alining that is likely to be necessary. The two sets of supporting-surfaces, being some distance apart, support the bearing rigidly and firmly and distribute the support for the weight of the shaft. This is of particular advantage where the bearing is of considerable length. By supporting the bearing by two sets of zones the parts can be made of small bulk and weight, and three or more oil-rings can be used, one of which is at or near the center of the bearing, which also is of especially great advantage in bearings having considerable length. The action of the oil-rings $L'$ $L^2$ $L^3$ is well understood. They rest on the upper part of the shaft S and are revolved by it, resulting in carrying oil, which collects in the lower portions of the concavity of the pillow-block, and into which they dip, to the top of the shaft, making a continuous lubrication.

What I claim as my invention, and desire to secure by Letters Patent, is—

1. In a combined pillow-block and bearing, two zones upon the surface of the bearing corresponding to two zones upon the interior surface of the pillow-block, and an oil-ring mounted on said bearing between said zones, substantially as described.

2. In a combined pillow-block and bearing, the bearing being movable relatively to the pillow-block, a tube of heat-conducting metal inserted firmly in said bearing and passing loosely through said pillow-block, substantially as described.

3. In a cap for a pillow-block, a ring-bolt having an oil-hole bored through its shank, substantially as described.

In testimony whereof I have hereunto set my hand this 15th day of February, 1896.

POMEROY W. POWER.

Witnesses:
WILFRID K. HUNTER,
WINFIELD LANGDON.